United States Patent [19]

Kamata

[11] Patent Number: 5,669,018

[45] Date of Patent: Sep. 16, 1997

[54] LENS-FITTED PHOTO FILM UNIT AND METHOD OF UNLOADING A CASSETTE FROM THE SAME

[75] Inventor: Kazuo Kamata, Kanagawa, Japan

[73] Assignee: Fuji Photo Film Co., Ltd., Kanagawa, Japan

[21] Appl. No.: 764,880

[22] Filed: Dec. 16, 1996

[30] Foreign Application Priority Data

Dec. 18, 1995 [JP] Japan ................................. 7-329183

[51] Int. Cl.⁶ ........................... G03B 17/02; G03B 17/26
[52] U.S. Cl. ............................. 396/6; 396/513; 396/538
[58] Field of Search ........................... 396/6, 512, 513, 396/516, 535, 538

[56] References Cited

U.S. PATENT DOCUMENTS

| 5,452,036 | 9/1995 | Kamata . | |
|---|---|---|---|
| 5,495,310 | 2/1996 | Takatori . | |
| 5,579,070 | 11/1996 | Smart et al. | 396/538 |
| 5,602,609 | 2/1997 | Balling | 396/513 |

Primary Examiner—A. A. Mathews
Attorney, Agent, or Firm—Young & Thompson

[57] ABSTRACT

A lens-fitted photo film unit includes a cassette containing chamber and a photo film roll chamber. The cassette containing chamber contains a cassette. The photo film roll chamber contains a roll of unexposed photo film drawn out of the cassette. The cassette incorporates a photo film port shutter rotatable between a closed position to block a photo film passage port and an open position to open the photo film passage port. The photo film is wound into the cassette by one frame after an exposure is taken thereon. A rotating member is connected to the port shutter and rotatable between a first position associated with the open position of the port shutter, and a second position associated with the closed position of the port shutter. The rotating member is disconnected from the port shutter at a time of moving the cassette in the cassette containing chamber for unloading the cassette from the cassette containing chamber. A torsion coil spring rotates the rotating member from the first position to the second position in response to external operation effected prior to moving the cassette in the cassette containing chamber. The cassette is unloaded from the cassette containing chamber after the photo film is wound therein.

18 Claims, 14 Drawing Sheets

LENS-FITTED PHOTO FILM UNIT AND METHOD OF UNLOADING A CASSETTE FROM THE SAME

BACKGROUND OF THE INVENTION

1. Field of the Invention

The present invention relates to a lens-fitted photo film unit and a method of unloading a cassette from the same. More particularly, the present invention relates to a lens-fitted photo film unit containing a photo film cassette in which a photo film port shutter is disposed, and a method of unloading the cassette from the lens-fitted photo film unit.

2. Description Related to the Prior Art

A lens-fitted photo film unit is known, and sold under a trade name such as "Fujicolor Quick Snap Super 800" (manufactured by Fuji Photo Film Co., Ltd.). The lens-fitted photo film unit includes a housing, which incorporates a simple shutter mechanism, and is pre-loaded with unexposed photo film. When a user purchases the lens-fitted photo film unit, he or she can take an exposure readily with it. In the lens-fitted photo film unit, a winding wheel is engaged with a spool inside a cassette shell. After effecting one exposure in one frame, the winding wheel is rotated to wind the photo film into the cassette shell as much as one frame. After taking exposures in all frames on the photo film, the lens-fitted photo film unit is forwarded to a photo laboratory, where a bottom lid of a cassette containing chamber is opened to unload the cassette shell by moving it down axially.

There are various suggestions to include a new plastic type of photo film cassette in the lens-fitted photo film unit. The photo film cassette does not have plush or light-trapping fabric in a photo film passage port, but has a plastic photo film port shutter, which is rotatable between an open position and a closed position. In the open position, the passage port is open. In the closed position, the passage port is blocked. To open and close the port shutter, a drive shaft of a camera or lens-fitted photo film unit is fitted on the port shutter and is rotated in forward and backward directions. A lock claw or pawl is disposed inside the cassette shell and has rigidity and resiliency. When the port shutter has the closed position, the lock claw is engaged with an engaging portion at an axial end of the port shutter, and keeps the port shutter from being rotated by incidental shock.

A commonly assigned patent U.S. Pat. No. 5,452,036 (corresponding to JP-A 6-130558) also discloses the lens-fitted photo film unit in which the cassette shell is used. A lock member is disposed on a bottom lid of the cassette containing chamber, and engaged with the port shutter of the cassette shell. While the lock member locks the bottom lid, the port shutter has the open position. When the lock member is released from the locking, the port shutter is rotated to the closed position.

There is a problem in the disposition of the lock member on the bottom lid, as the lock member thickens the bottom lid to increase the height of the lens-fitted photo film unit, which should be compact in the size. Another problem lies in laboriousness in operation of releasing the lock member to open the bottom lid. Photofinishing operators must handle a great number of lens-fitted photo film units. The low operability of the lock member hinders efficiency in the photofinishing from being improved.

To solve these problems, it is conceivable that a rotating member is disposed on the top of the cassette containing chamber, is engaged with the port shutter, and causes the rotating member to the closed position in response to opening the bottom lid. However a problem is still likely to occur: the rotating member after rotating the port shutter to the closed position is squeezed or stopped by the lock claw. The cassette shell is likely to fail to exit from the cassette containing chamber even when the bottom lid is open. The cassette shell could be unloaded by shaking or shocking the housing. But there would be possibility of dropping the cassette shell and striking the cassette shell against a floor or a wall of a room. The cassette shell might be broken incidentally to subject the photo film to ambient light. Alternatively a tool such as a screwdriver could be used to scrape out the cassette shell. However the cassette shell would be scratched to have the appearance damaged. The use of the tool would be inefficient.

The lock claw locks the port shutter when the rotating member is moved away from the engaging portion after rotating the port shutter to the closed position. However the lock claw cannot be engaged with the engaging portion if the port shutter is shifted rotationally in an accidental manner at the time of disengagement of the port shutter from the rotating member. There is no known technique capable of keeping orientation of the cassette shell in the rotational direction before the disengagement of the port shutter from the rotating member.

SUMMARY OF THE INVENTION

In view of the foregoing problems, an object of the present invention is to provide a lens-fitted photo film unit from which a cassette can be easily unloaded, and in which a photo film port shutter can be reliably locked in a closed position, and a method of unloading the cassette from the lens-fitted photo film unit.

In order to achieve the above and other objects and advantages of this invention, a rotating member is connected to the port shutter and rotatable between first and second positions, the port shutter having the open position when the rotating member has the first position, and the port shutter having the closed position when the rotating member has the second position, the rotating member being disconnected from the port shutter at a time of moving the cassette in the cassette containing chamber for unloading the cassette from the cassette containing chamber. A drive mechanism rotates the rotating member from the first position to the second position in response to external operation effected prior to moving the cassette in the cassette containing chamber.

The rotating member has a connective portion, disposed to project into the cassette containing chamber through an upper wall of the cassette containing chamber, for connection to the port shutter.

The drive mechanism includes a spring for biasing the rotating member from the first position toward the second position. A retainer member moves from a retaining position to a releasing position in response to the external operation, the retainer member retaining the rotating member in the first position against the spring when the retainer member has the retaining position, the retainer member allowing the spring to rotate the rotating member to the second position when the retainer member has the releasing position.

A body has the cassette containing chamber and the roll chamber, the cassette containing chamber having a rear opening and a bottom opening. A rear cover covers a rear of the body. A bottom cover closes the bottom opening, the bottom cover being formed integrally with the rear cover, the bottom cover being removed from the bottom opening after the external operation to render the cassette movable in the cassette containing chamber.

The external operation is associated directly or indirectly with operation of removing the bottom cover from the body.

Furthermore, a claw portion is formed integrally with the rear cover, disposed above the cassette containing chamber, and engaged with the body for securing the rear cover to the body, the claw portion being disengaged by the external operation from the body.

In a preferred embodiment, a claw portion is formed integrally with the bottom cover, engaged with the body for closing the bottom opening with the bottom cover, the claw portion being removed from the body by the external operation.

To unload the cassette from the lens-fitted photo film unit, first or second engaging means is disengaged after the photo film is wound in the cassette, where the first engaging means has engaged the bottom cover with the body, and the second engaging means has engaged the rear cover with the body. The rotating member is rotated in response to disengaging the first or second engaging means, the rotating member rotating the port shutter to set the port shutter in the closed position. The bottom cover is removed from the bottom opening after disengaging the first engaging means. The cassette is moved in the cassette containing chamber for exiting the cassette from the bottom opening at least partially, to disengage the rotating member from the port shutter. The cassette is further moved to exit the cassette from the cassette containing chamber.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
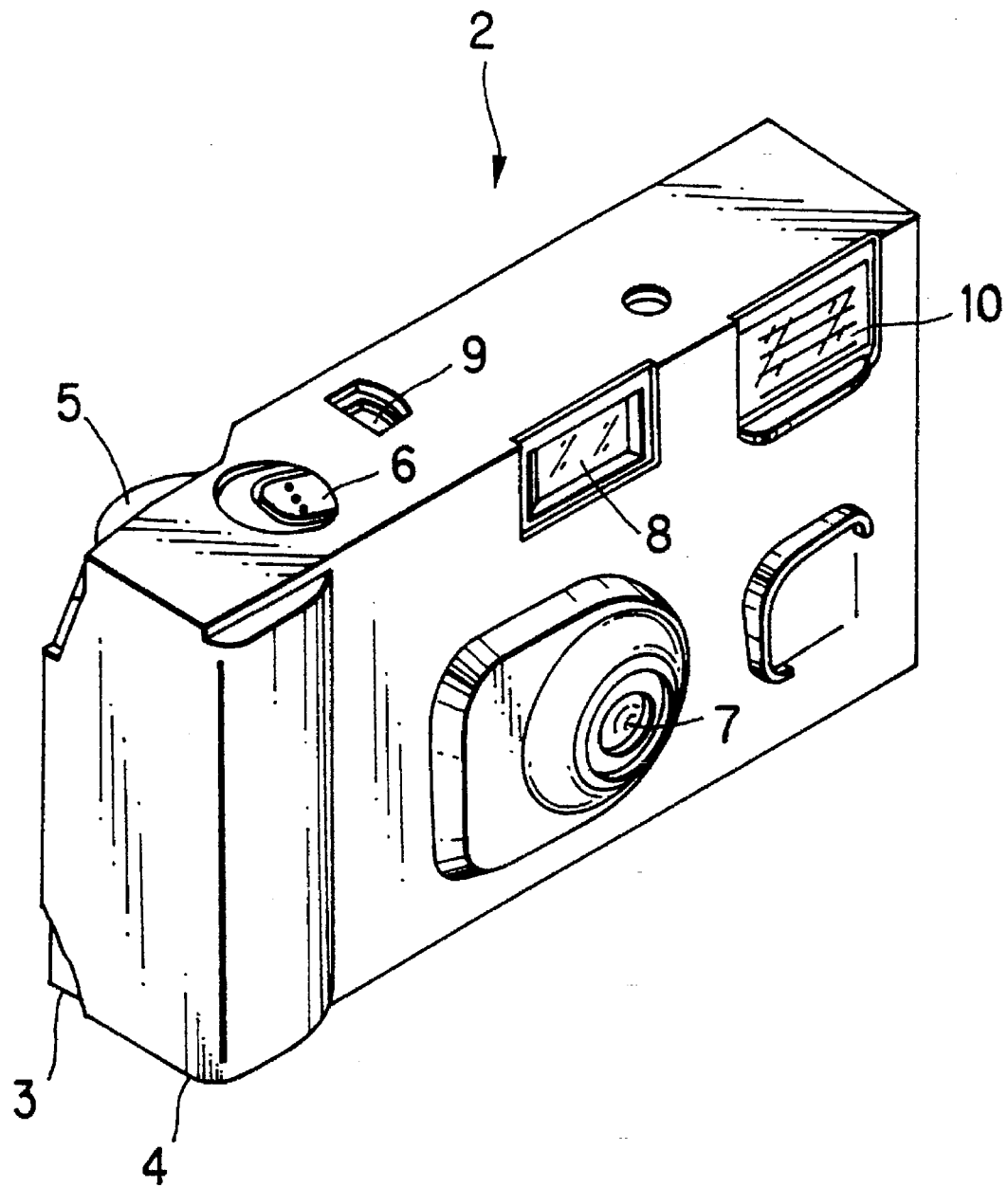
FIG. 1 is a perspective illustrating a lens-fitted photo film unit.

In FIG. 1, a lens-fitted photo film unit 2 includes a housing 3 incorporating a structure for effecting an exposure, and a cardboard wrapper 4 containing the housing 3. The cardboard wrapper 4 has printed letters for information and patterns for decorative appearance, and has openings through which there appear a winding wheel 5, a shutter release button 6, a taking lens 7, a viewfinder 8, an indicator window 9 and an electronic flash device 10.

Figure 2:
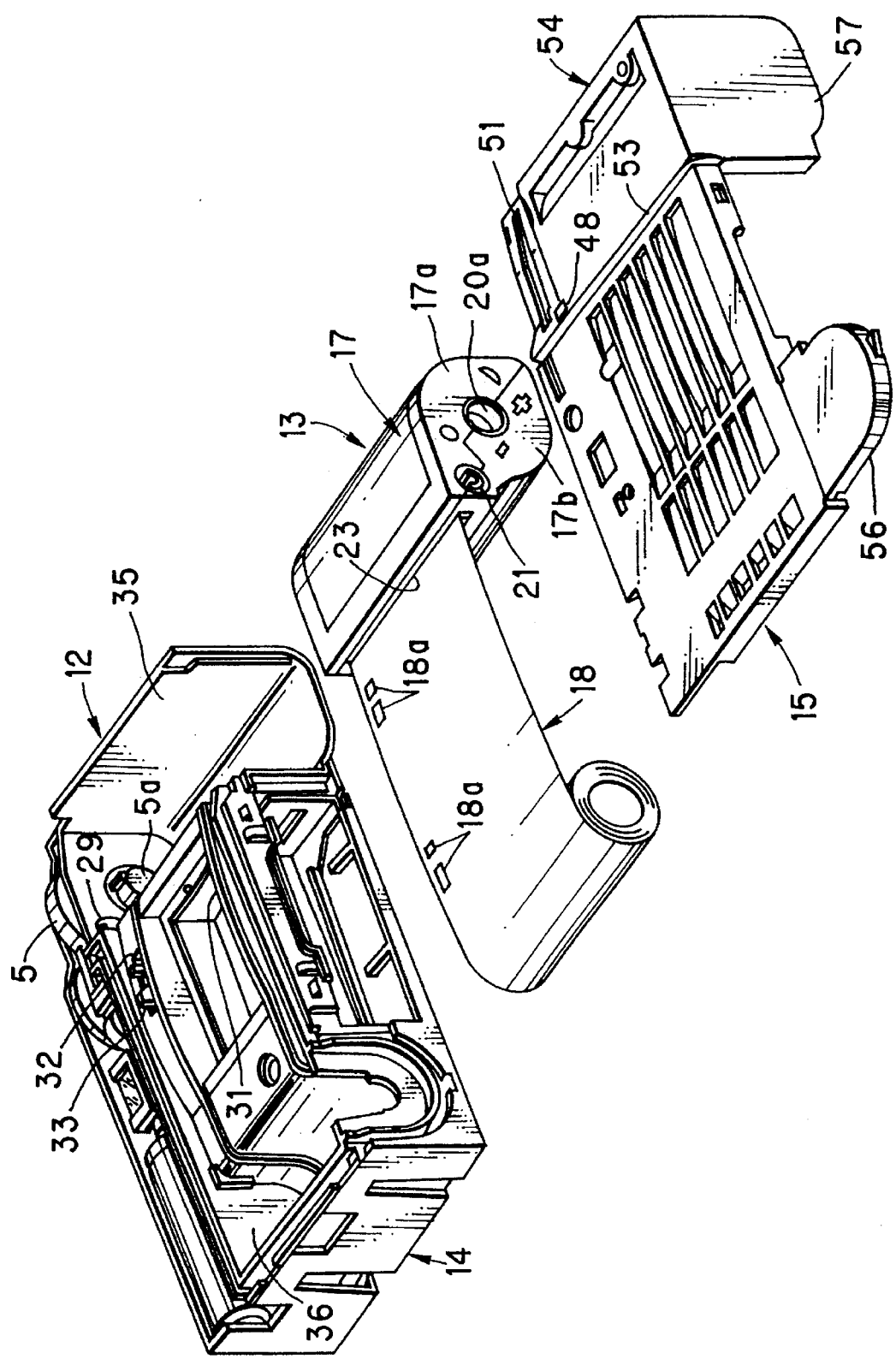
FIG. 2 is an exploded perspective illustrating a housing of the lens-fitted photo film unit.

In FIG. 2, the housing 3 is illustrated, including a main body or photo film containing body 12, a photo film cassette 13, a front cover 14 and a rear cover 15. The photo film cassette 13 is contained in the main body 12. The front cover 14 is fixedly mounted on the front of the main body 12. The rear cover 15 is fixedly mounted on the rear of the main body 12. The housing 3 also includes an exposure unit having the structure for effecting an exposure, and the flash device 10 which incorporates a flash emitting window and the flash circuit.

The photo film cassette 13 is constituted by a plastic cassette shell 17 and a photo film 18 drawn from the cassette shell 17. The photo film 18 from the cassette shell 17 is wound as a roll and contained in the housing 3. The cassette shell 17 includes a spool 20 for winding the photo film 18 thereabout, and a photo film port shutter 21 for shielding the inside of the cassette shell 17 from ambient light. The cassette shell 17 also includes a lock device for locking the port shutter 21, an indicator for used statuses of the photo film 18, and a bar code disk on which a bar code is printed for various data of the photo film 18.

The cassette shell 17 is constituted by an upper shell half 17a and a lower shell half 17b respectively formed from plastics. The photo film cassette 13 has such a structure that rotation of the spool 20 in a direction to unwind the photo film 18 causes a leader of the photo film 18 to advance through a photo film passage port 23 to the outside of the cassette shell 17.

Figure 3:
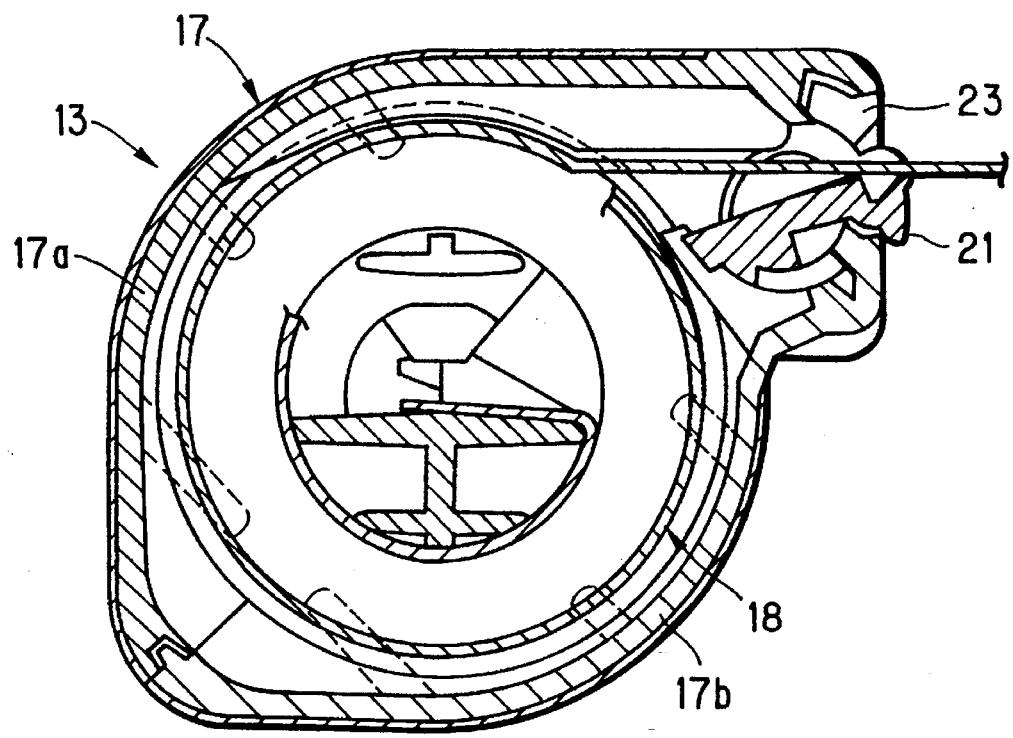
FIG. 3 is a cross section illustrating a photo film cassette at the time of opening the port shutter.
Figure 4:
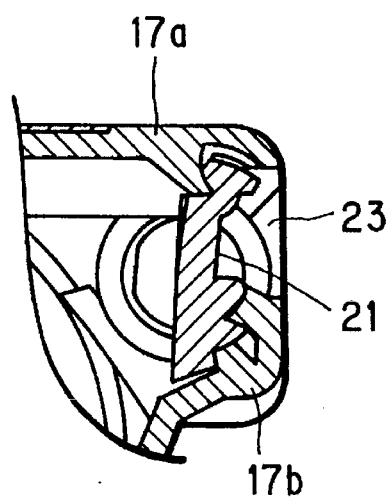
FIG. 4 is a cross section illustrating the photo film cassette at the time of closing the port shutter.

The port shutter 21 is contained in rotatable fashion in the passage port 23 between the shell halves 17a and 17b, and rotatable between a position opening the passage port 23 in FIG. 3 and a position closing the passage port 23 in FIG. 4. When the port shutter 21 has the closed position, the main body 12 is received in recesses formed inside the shell halves 17a and 17b, for keeping the inside of the cassette shell 17 light-tight.

Figure 5:
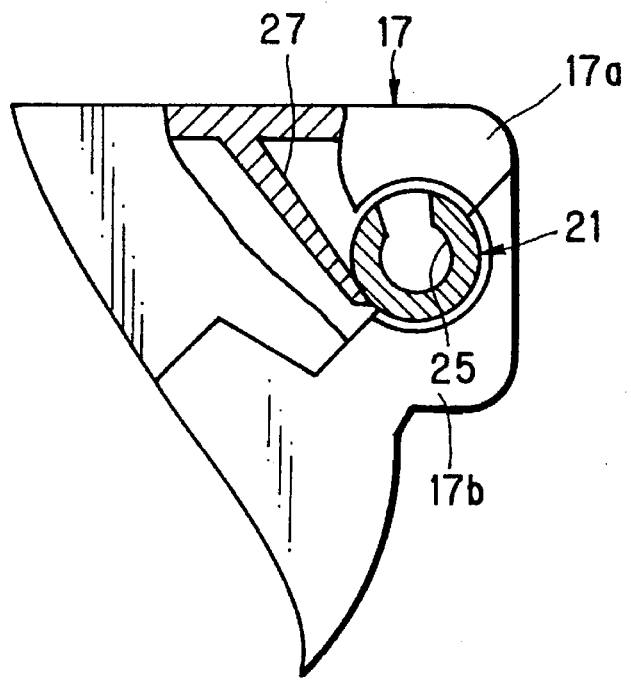
FIG. 5 is a side elevation, partly broken, illustrating a state of a lock claw while the port shutter is open.

In FIG. 5, each of both ends of the port shutter 21 has a keyhole 25 having a C-shape as viewed in cross section. The keyhole 25 appears through each of end faces of the cassette shell 17. As will be described more in detail with FIG. 7, a key shaft 29 of a rotating member 28 is engaged with the keyhole 25. The port shutter 21 is rotated from the open position to the closed position in response to external operation, which is effected shortly preceding to withdrawal of the cassette shell 17 from the housing 3.

Figure 6:
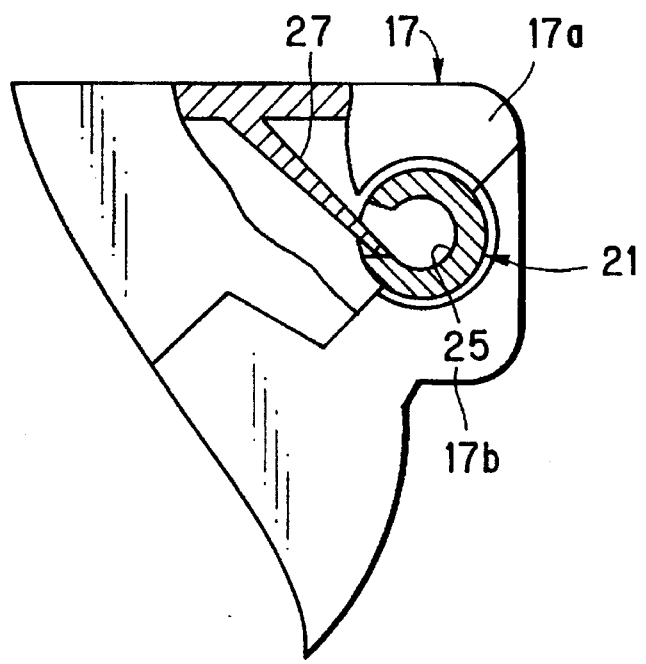
FIG. 6 is a side elevation, partly broken, illustrating a state of the lock claw at the locking time.

A lock claw or pawl 27 is formed with the inside of the upper shell half 17a for the purpose of locking the port shutter 21 in the closed position. The cassette shell 17 consists of a rigid tapered bar having resiliency. In FIG. 6, the lock claw 27 is inserted in the keyhole 25 when the port shutter 21 is closed, to stop the port shutter 21 from rotating toward the open position, so that the light-tightness of the cassette shell 17 is rendered reliable. When the port shutter 21 has the open position, the port shutter 21 is pressed on the cylindrical surface of the keyhole 25 as shown in FIG. 5, frictionally to keep the port shutter 21 from rotating in an inadvertent manner.

Figure 7:
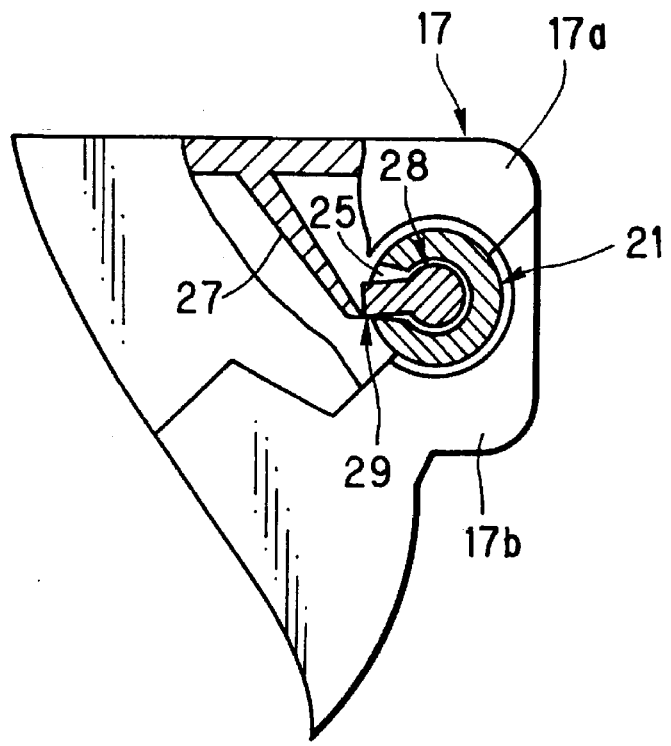
FIG. 7 is a side elevation, partly broken, illustrating a state of the lock claw shortly after the closing the port shutter.

In FIG. 7, if the port shutter 21 is rotated to the closed position by the key shaft 29, the lock claw 27 cannot enter the keyhole 25 as long as the key shaft 29 is located in the keyhole 25 of the port shutter 21. When the cassette shell 17 is slid in the axial direction to move the keyhole 25 away from the key shaft 29, the lock claw 27 resiliently enters into the keyhole 25 to latch the port shutter 21 in the closed position.

The main body 12 is generally formed from plastic material having opacity. In the center of the main body 12 is formed an exposure aperture 31 for defining a range of an exposure taken on the photo film 18. The exposure aperture 31 is curved to project toward the rear for the purpose of compensation for curvature of the field at the position of the photo film 18. In front of the exposure aperture 31, there is formed a light-shielding tunnel (not shown) for covering a photographic light path in light-tight fashion. On a front side of the exposure aperture 31, the taking lens 7 and an exposure unit are mounted. The exposure unit is constituted by unifying a shutter mechanism, a shutter charge mechanism, a one-frame feeding mechanism, and a counter mechanism. On the front of the main body 12, the flash device is incorporated.

There is a slot 32 formed in the main body 12 and directly over the exposure aperture 31. A driven sprocket wheel 33 is contained in the slot 32 and partially projects to the rear for mesh with perforations 18a in the photo film 18. The sprocket wheel 33 is incorporated in the exposure unit, is rotated by the movement of the photo film 18 being fed, and operates to drive the shutter charge mechanism, the one-frame feeding mechanism, and the frame counter mechanism. Note that the perforations 18a of the photo film 18 are constituted by two perforations arranged per one frame. The two include one greater perforation and one smaller perforation. The sprocket wheel 33 also has at least two teeth which are greater and smaller for mesh with the perforations 18a.

A cassette containing chamber 35 and a photo film roll chamber 36 are disposed respectively on lateral sides of the exposure aperture 31. The cassette containing chamber 35 contains the cassette shell 17. The roll chamber 36 contains the roll of the photo film 18. An inner surface of the cassette containing chamber 35 has a shape for receiving the cassette shell 17 in a fitted manner. An inner surface of the roll chamber 36 has a cylindrical shape for easiness in containing the roll of the photo film 18. A front wall of the cassette containing chamber 35 protrudes more than a front wall of the roll chamber 36. In effecting an exposure, the cassette containing chamber 35 is grasped manually by a user as a grip.

On the top of the cassette containing chamber 35, the winding wheel 5 and the rotating member 28 are mounted respectively in a rotatable manner. The winding wheel 5 is rotated to wind the photo film 18 into the cassette shell 17 each time after effecting one exposure. The rotating member 28 is engaged with the keyhole 25 of the port shutter 21 and rotated in the closing direction. Furthermore a rotating mechanism for rotating the rotating member 28 in the closing direction of the port shutter 21 is mounted on the top of the cassette containing chamber 35. Under the winding wheel 5 is formed a drive shaft 5a, which projects into the cassette containing chamber 35 and is engaged with the spool 20 of the cassette shell 17.

Figure 8:
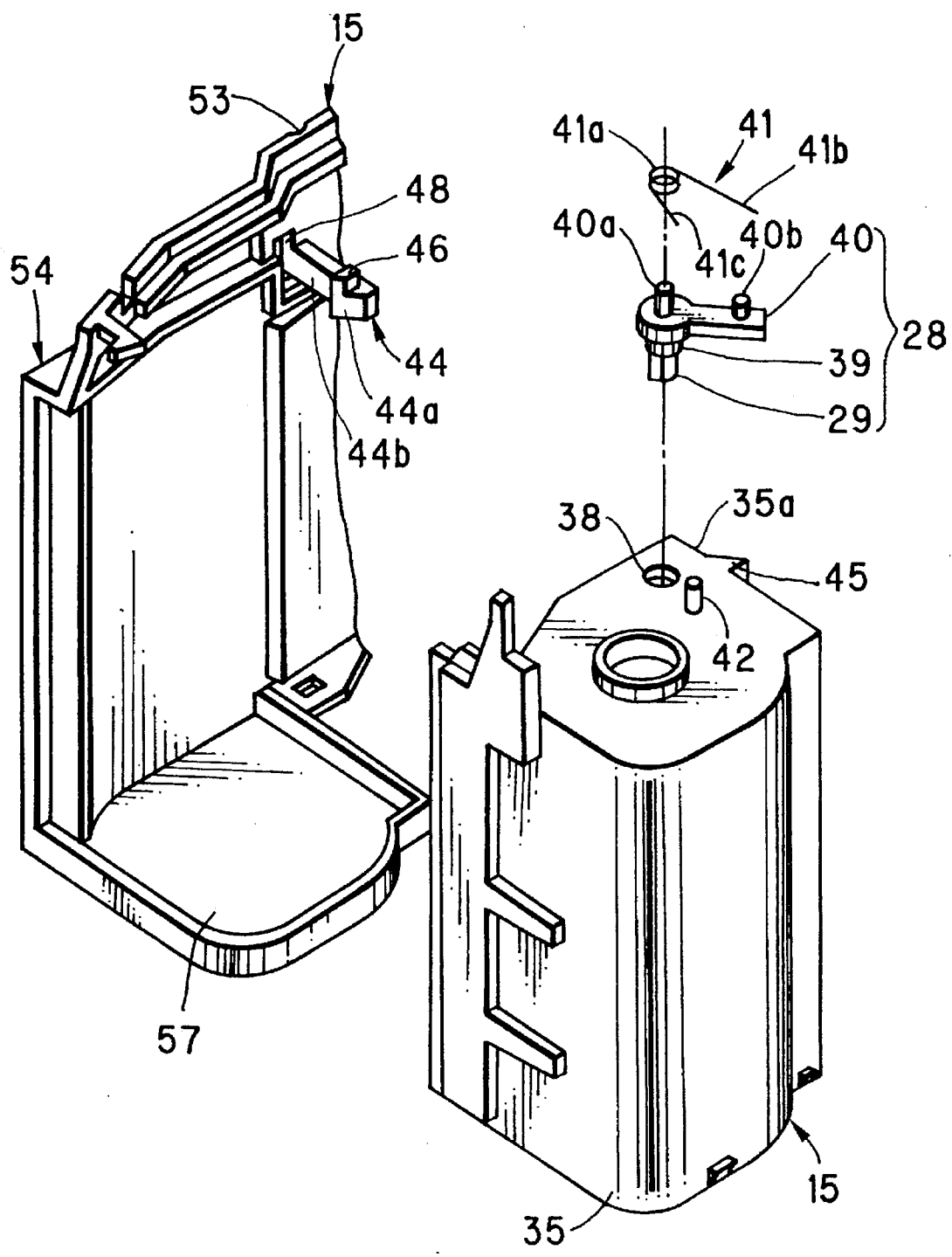
FIG. 8 is an exploded perspective illustrating a cassette containing chamber with a structure for rotating a rotating member.

In FIG. 8, the rotating member 28 is inserted into a through hole 38 formed in the top of the cassette containing chamber 35. The rotating member 28 includes the key shaft 29, a shaft hub portion 39 and a driven projection or lever portion 40. The key shaft 29 is engaged with the keyhole 25 of the port shutter 21. The shaft hub portion 39 is rotated in the through hole 38. The driven projection 40 is retained by the retainer of the rotating mechanism. There are two pins 40a and 40b disposed on the top of the driven projection 40 for receiving a torsion coil spring 41 as a drive mechanism. The torsion coil spring 41 includes a coiled portion 41a mounted about the pin 40a, a first arm 41b mounted on the pin 40b, and a second arm 41c mounted on a pin 42 which is disposed near to the through hole 38. The rotating member 28 is biased rotationally in the counterclockwise direction for closing the port shutter 21.

Figure 9:
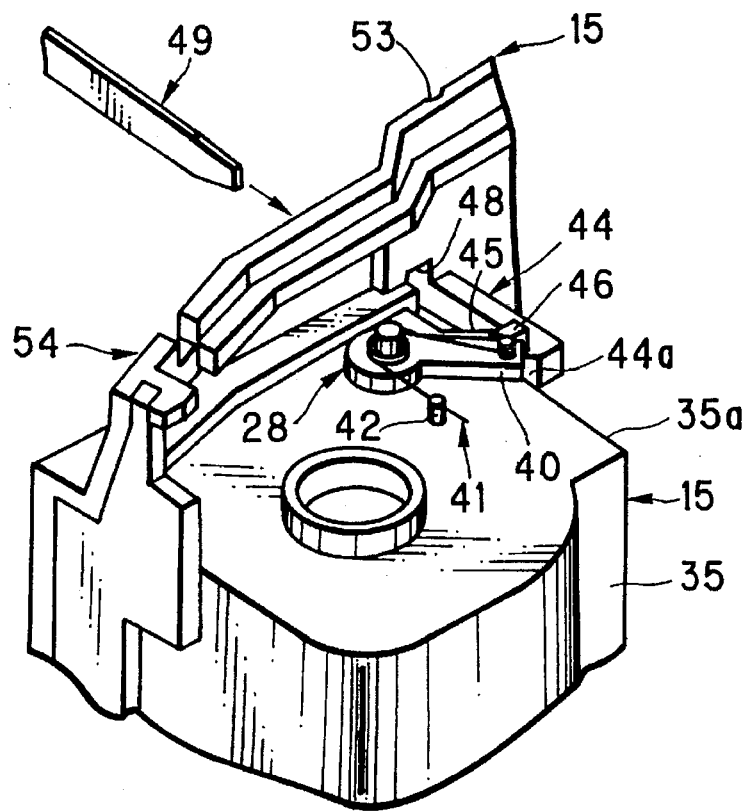
FIG. 9 is a perspective illustrating engagement of a claw portion and the rotating member.
Figure 10:
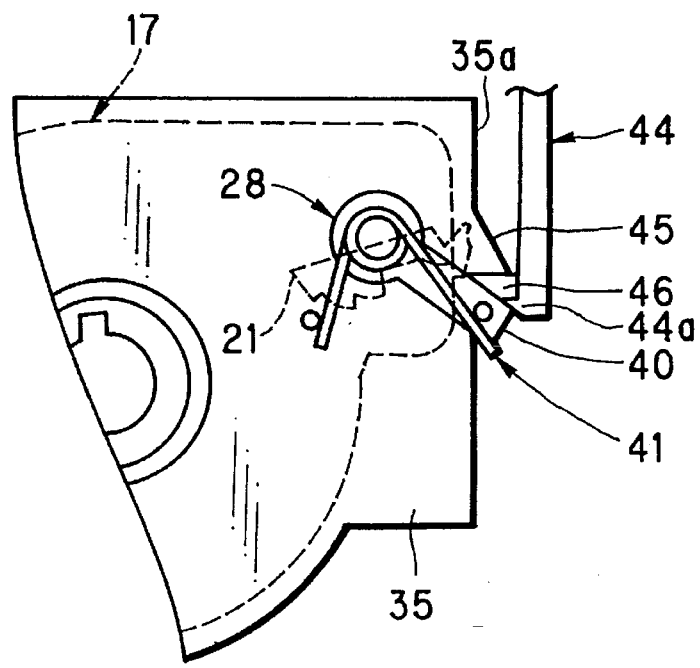
FIG. 10 is a plan illustrating the engagement of the claw portion and the rotating member.

On a side wall 35a of the cassette containing chamber 35, an engaging ridge 45 is formed. On a first rear portion 54 of the rear cover 15, a claw portion 44 is formed. The claw portion 44 includes a claw 44a and an arm 44b. The claw portion 44 is engaged with the ridge 45. On the top of the claw portion 44 is formed a retainer projection 46, which retains the rotating member 28 in the open position of the port shutter 21, and allows the rotating member 28 to rotate toward the closing position. In FIGS. 9 and 10 where the claw portion 44 is engaged with the ridge 45, the port shutter 21 is retained in the open position by the pressing of the driven projection 40 of the rotating member 28 against the retainer projection 46 due to the bias of the torsion coil spring 41.

Figure 11:
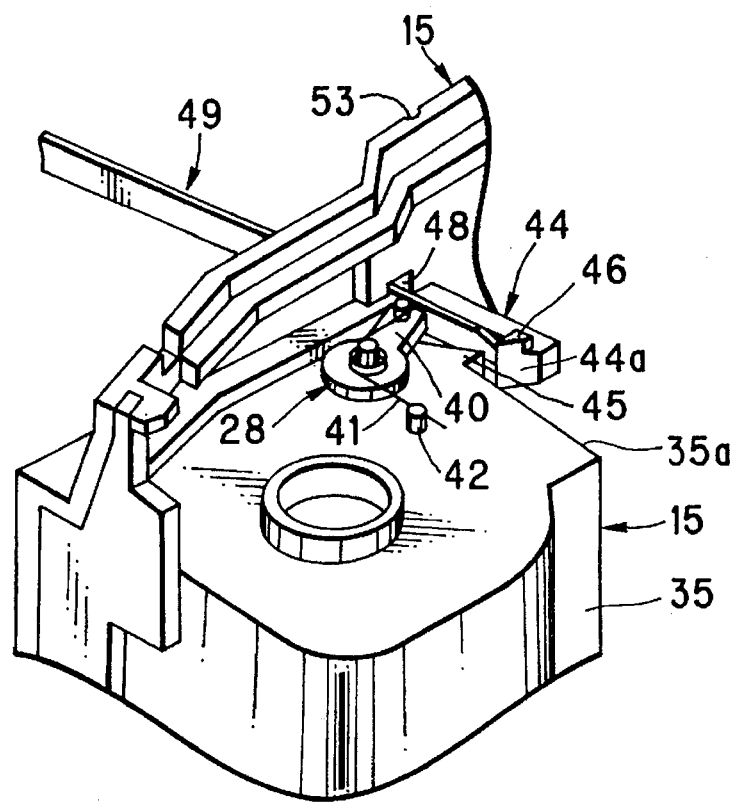
FIG. 11 is a perspective illustrating disengagement of the claw portion from the rotating member.
Figure 12:
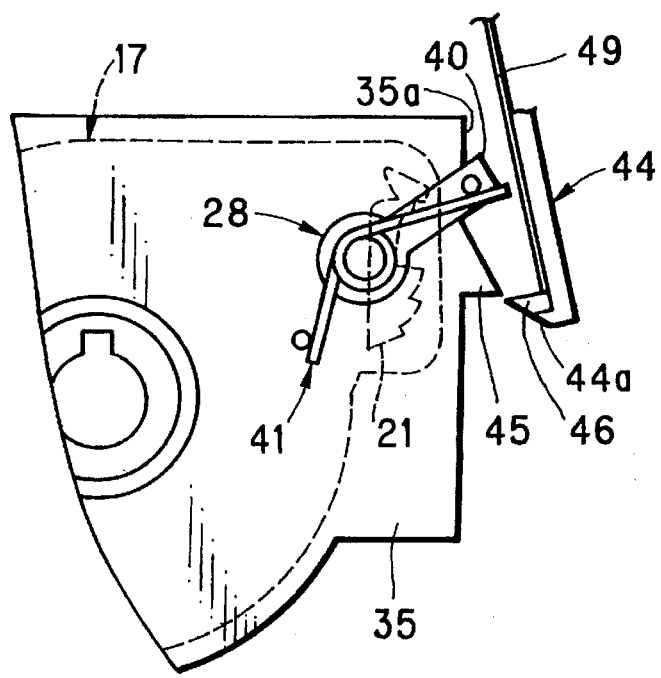
FIG. 12 is a plan illustrating disengagement of the claw portion from the rotating member.

To allow the rotating member 28 to rotate in the closing direction, external operation is effected shortly prior to removal of the rear cover 15 from the housing 3 for unloading of the cassette shell 17 from the cassette containing chamber 35. The external operation is to disengage the claw portion 44 from the ridge 45. There is an access hole 48 formed near to the claw portion 44 in the rear cover 15. A jig or tool 49, such as a screwdriver having a minus-sign shape, is used and inserted into the access hole 48. In FIGS. 11 and 12, the tool 49 is pressed against the claw portion 44 and bends it away from the cassette containing chamber 35. The driven projection 40 is not contacted on the retainer projection 46. The rotating member 28 is caused by the torsion coil spring 41 to rotate in the closing direction of the port shutter 21. Then the port shutter 21 engaged with the key shaft 29 is rotated to the closed position.

The front cover 14 is mounted on the main body 12 to cover the exposure unit and part of the flash device. The front cover 14 has the shutter release button 6 and a push-button for charging the flash device, as portions of the front cover 14.

The rear cover 15 is generally formed from plastic material having opacity. There is an opening 51 formed in the rear cover 15 for the winding wheel 5 to appear externally. The rear cover 15 is secured to the rear of the main body 12 by use of the claw portion 44 and a number of other hooks. The rear cover 15 operates to keep the photo film 18 flat, and keep the cassette containing chamber 35 and the roll chamber 36 light-tight. There are a number of spot portions at which the rear cover 15 is welded to the main body 12 by means of ultrasonic welding for the purpose of raising the light-tightness and avoiding reloading of an unused photo film cassette.

The rear cover 15 is constituted by a left portion behind the roll chamber 36, a central portion behind the exposure aperture 31, and the first rear portion 54 behind the cassette containing chamber 35. A combination of the left and central portions is hereinafter called a second rear portion 15a (See FIG. 13). In the present invention, there is formed a separating line 53 having small thickness between the second rear portion 15a and the first rear portion 54. The rear cover 15 is breakable along the separating line 53 to separate the first rear portion 54 from the second rear portion 15a.

Figure 13:
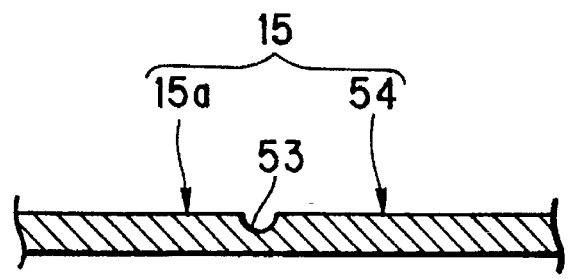
FIG. 13 is a cross section illustrating a separating line of a rear cover.

In FIG. 13, a portion along the separating line 53 has a reduced thickness smaller than the other portions of the rear cover 15. To unload the photo film cassette 13 from the housing 3, the claw portion 44 is shifted to cause the port shutter 21 to rotate to the closed position. Then the top of the first rear portion 54 is pulled away from the housing 3, until the separating line 53 is torn to remove the first rear portion 54 from the rear cover 15. Note that the easiness in removal of the first rear portion 54 increases according to the thinness of the separating line 53. But the separating line 53 should have sufficient thickness for keeping light-tightness of the cassette containing chamber 35.

An openable bottom lid 56 of a pull-top type is formed integrally with the bottom of the rear cover 15, and closes the bottom of the roll chamber 36. A bottom cover 57 is formed integrally with the bottom of the first rear portion 54, and closes the bottom of the cassette containing chamber 35. Unlike the openable bottom lid 56, the bottom cover 57 cannot be opened easily, but is disposed with on the first rear portion 54 in a rigidly stationary manner. Note that the inside of the bottom cover 57 has ridges (not shown) for keeping the cassette containing chamber 35 light-tight, but is simplified in depiction of FIG. 8 for convenience.

Figure 14:
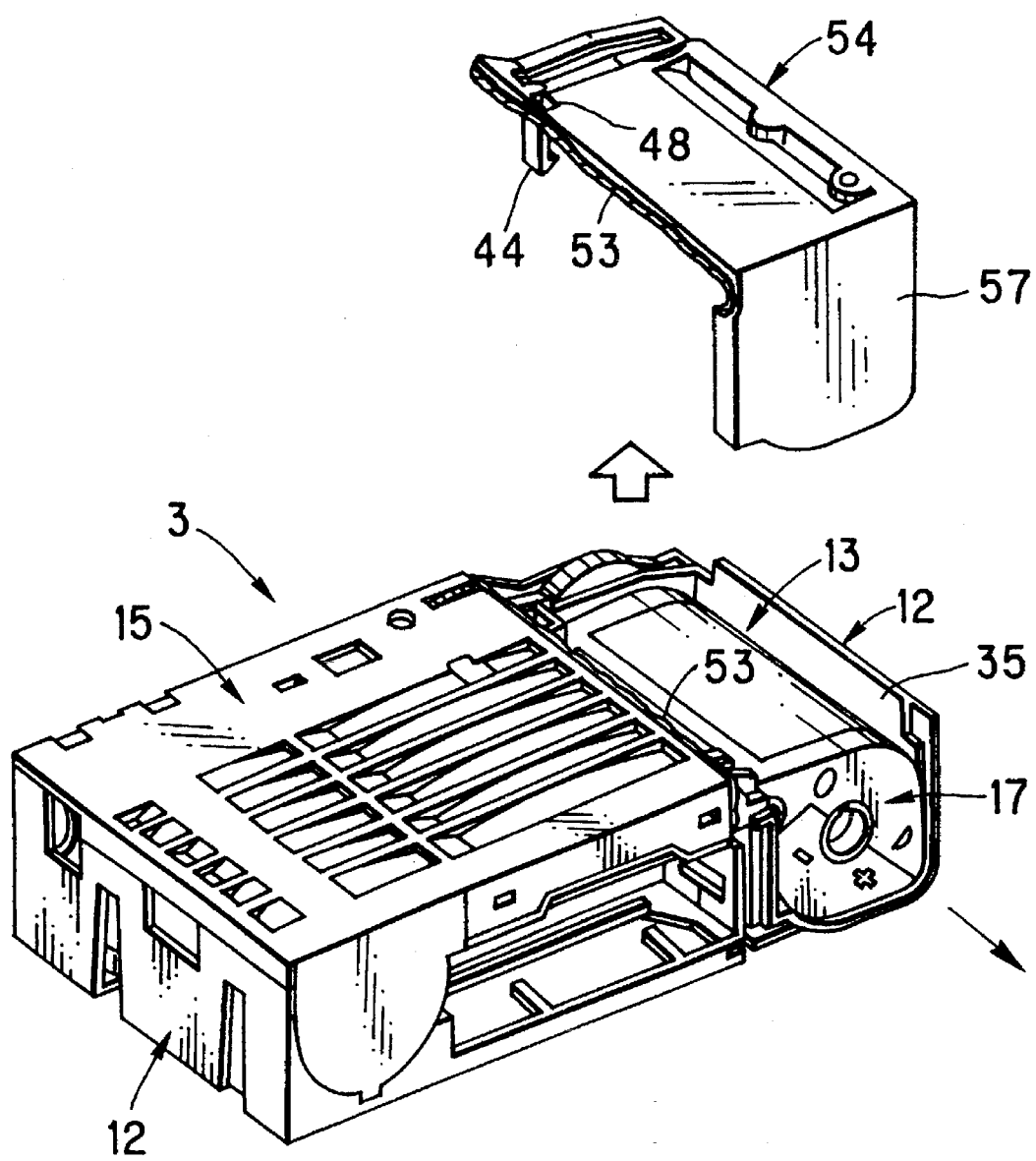
FIG. 14 is an explanatory view in perspective, illustrating the housing from which a first rear portion and a bottom cover are removed.

In FIG. 14, the bottom cover 57 is removed from the housing 3 together with the first rear portion 54. Both the rear and the bottom of the cassette containing chamber 35 are opened. The rear of the cassette shell 17 can be manually pressed, and slid downwards in the cassette containing chamber 35. In the sliding, there occurs no change in the orientation of the cassette shell 17. The port shutter 21 does not rotate inadvertently. Upon disengagement of the key shaft 29 of the rotating member 28 from the port shutter 21, the lock claw 27 is inserted in the keyhole 25 of the port shutter 21.

Operation of the above embodiment is described. A user purchases the lens-fitted photo film unit 2 of FIG. 1, rotates the winding wheel 5, and charges the shutter to get ready to release the shutter. A photographic subject to be taken is observed through the viewfinder 8. The shutter release button 6 is depressed to take one exposure. After the exposure, again the winding wheel 5 is rotated to wind the photo film 18 by one frame into the cassette shell 17. Plural exposures are taken on the photo film 18 from the roll chamber 36. Then the winding wheel 5 is rotated to a sufficiently great extent, until all the photo film 18 is contained into the cassette shell 17.

The lens-fitted photo film unit 2 after effecting exposures is forwarded by the user to a photo laboratory via a photo-finishing agent. In the photo laboratory, the cardboard wrapper 4 is eliminated to unload the cassette shell 17 from the housing 3. Note that, before the unloading of the cassette shell 17, the winding wheel 5 is rotated endlessly for the purpose of checking the winding of all the photo film 18 into the cassette shell 17.

To unload the cassette shell 17 from the housing 3, the first rear portion 54 and the bottom cover 57 in FIG. 2 are removed from the housing 3. As external operation shortly preceding to this removal, the plural claws or hooks securing the first rear portion 54 to the main body 12 are disengaged.

To disengage the claw portion 44 from the ridge 45 in FIGS. 9 and 10, the jig or tool 49 is inserted into the access hole 48 in the first rear portion 54, to bend the claw portion 44 away from the ridge 45. In FIGS. 11 and 12, the retainer projection 46 is similarly moved away from the driven projection 40 of the rotating member 28. The bias of the torsion coil spring 41 rotates the rotating member 28 in the counterclockwise direction. The port shutter 21 is rotated from the open position of FIG. 3 to the closed position of FIG. 4. Note that, in FIG. 7, the lock claw 27 is not inserted in the keyhole 25, because the keyhole 25 of the port shutter 21 is engaged with the key shaft 29 of the rotating member 28.

Afterwards the top of the first rear portion 54 is pulled away from the housing 3. The separating line 53 is broken to separate the first rear portion 54 from the second rear portion 15a of the rear cover 15. The bottom cover 57 is also separated together with the first rear portion 54. In FIG. 14, both the rear and the bottom of the cassette containing chamber 35 are opened.

After the removal of the first rear portion 54, the rear of the cassette shell 17 can be manually pressed, and slid downwards in the cassette containing chamber 35. No change occurs in the orientation of the cassette shell 17 being slid. The port shutter 21 does not rotate inadvertently. In FIG. 6, upon disengagement of the key shaft 29 from the port shutter 21, the lock claw 27 is unfailingly inserted in the keyhole 25 of the port shutter 21 to lock the port shutter 21 in the closed position.

The inside of the cassette shell 17 is reliably protected from ambient light by the locking of the port shutter 21 in the closed position. The cassette shell 17 can be conveyed to a line for development without fogging the photo film 18. The first rear portion 54 is separated from the second rear portion 15a of the rear cover 15. The rear cover 15 cannot be used as a part of a housing which would be recycled by loading an unused photo film cassette.

Another preferred embodiment is described, in which external operation inevitably prior to opening the bottom lid causes the port shutter to close. Elements similar to those of the above embodiment are designated with identical reference numerals.

Figure 15:
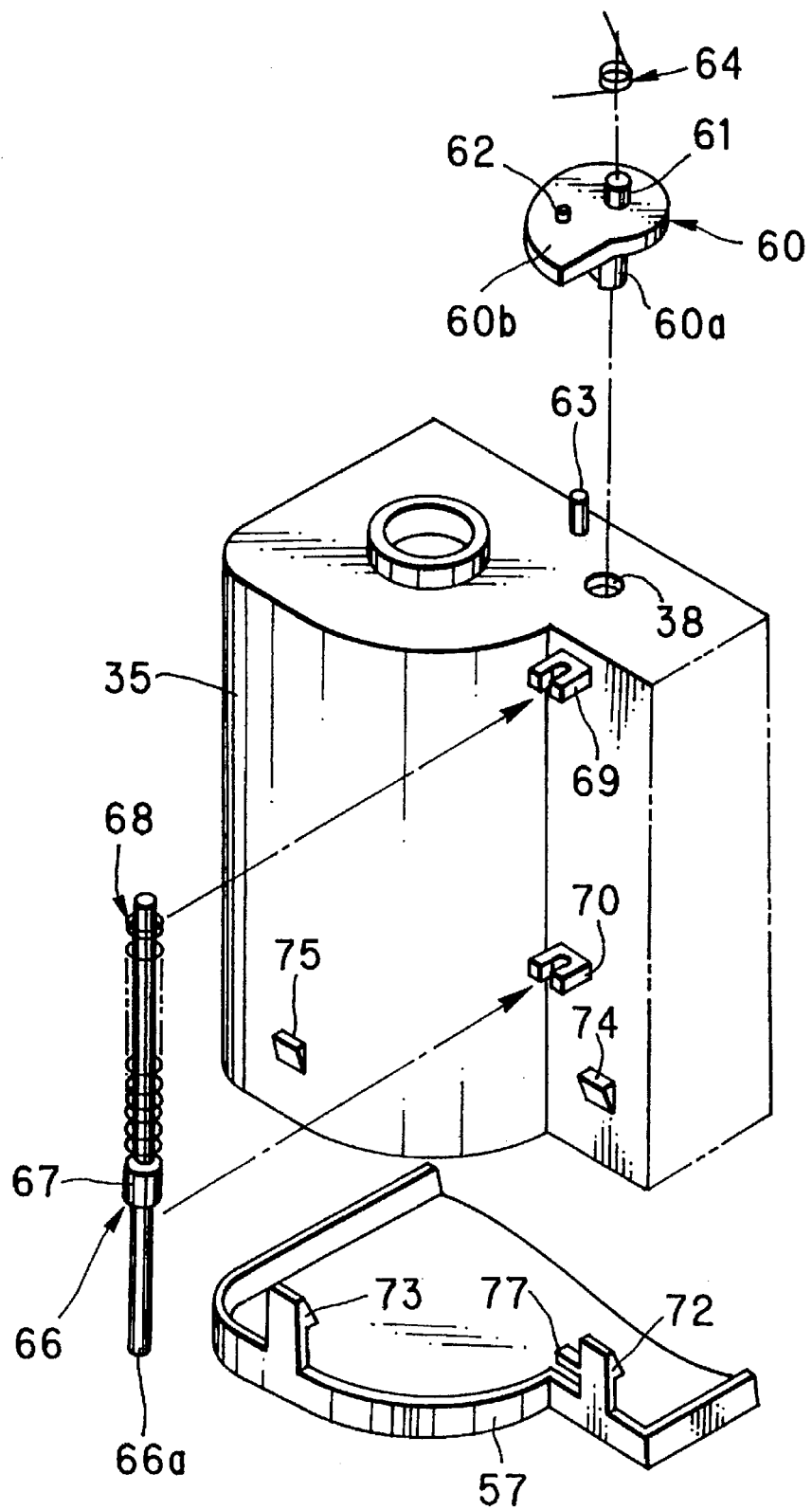
FIG. 15 is an explanatory view in perspective, illustrating another preferred embodiment in which a slidable retainer rod operates to rotate the rotating member.

In FIG. 15, a rotating member 60 is supported in the through hole 38 of the cassette containing chamber 35 in a rotatable manner, and is adapted to engagement of the port shutter 21 of the cassette shell 17. The rotating member 60 includes a key shaft 60a engaged with the keyhole 25, and a driven projection 60b like a lever, which is retained by a retainer in the open position of the port shutter 21. A top face of the driven projection 60b has two pins 61 and 62. A pin 63 is disposed near to the through hole 38. A torsion coil spring 64 as a drive mechanism is secured to the pins 61, 62 and 63, and biases the rotating member 60 to the closed position of the port shutter 21.

On the front wall of the cassette containing chamber 35 is mounted a retainer rod 66, which is slidable in a vertical direction, retains the rotating member 60 in a position to keep the port shutter 21 in the open position, and allows the rotating member 60 to rotate. The retainer rod 66 has a circular shape as viewed in cross section, and has a thicker portion 67 of which a diameter is greater. A rod biasing coil spring 68 is mounted about the retainer rod 66. The rod biasing spring 68 has a smaller diameter than that of the thicker portion 67, and moved downwards for the retainer rod 66 to be inserted in the rod biasing spring 68. The retainer rod 66 is inserted in rail members 69 and 70 in front of the cassette containing chamber 35 to dispose the thicker portion 67 and the rod biasing spring 68 between the rail members 69 and 70. At the thicker portion 67, the rod biasing spring 68 biases the retainer rod 66 downwards.

The bottom cover 57 closing the bottom of the cassette containing chamber 35 is formed integrally with the first rear portion 54. Two claw portions 72 and 73 are formed on the front of the bottom cover 57. The claw portions 72 and 73 are respectively engaged with engaging ridges 74 and 75 which are formed on the front wall of the cassette containing chamber 35, to enclose the cassette containing chamber 35 light-tightly.

Figure 16:
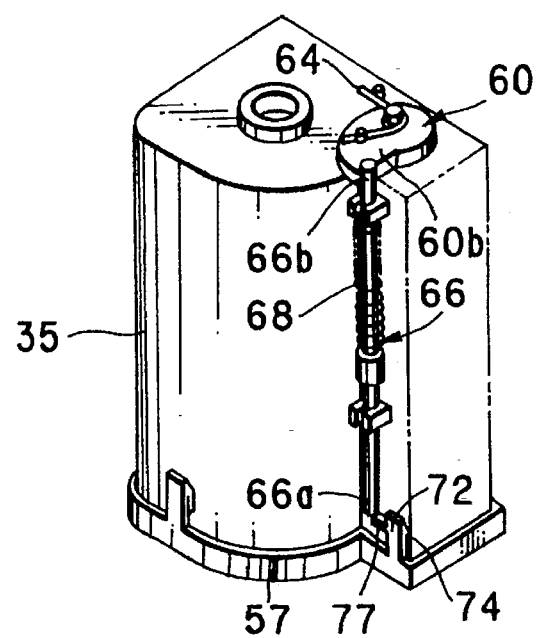
FIG. 16 is an explanatory view in perspective, illustrating a state of the retainer rod before sliding.
Figure 18:
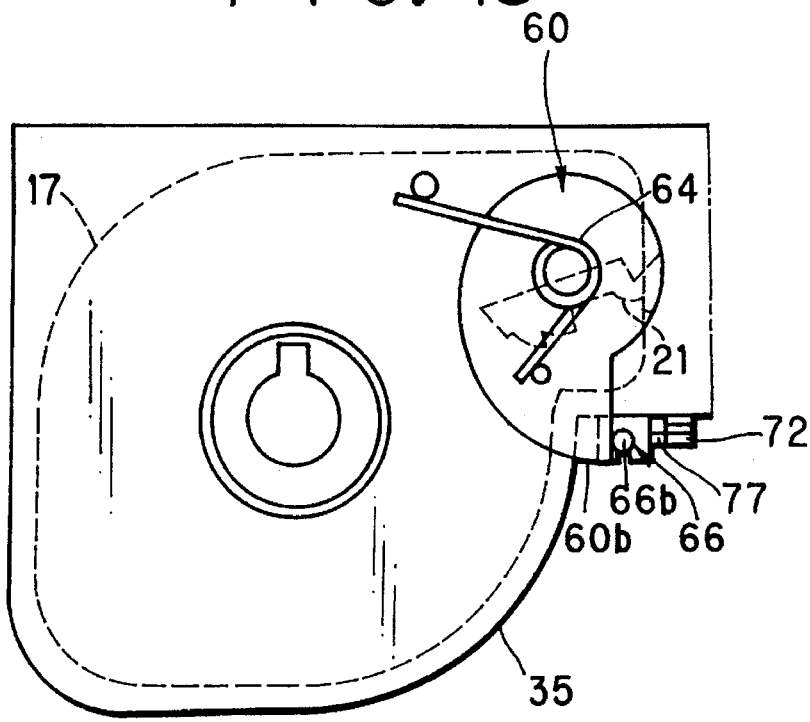
FIG. 18 is a plan illustrating the state of the retainer rod before sliding.

There is a stopper projection 77 projecting horizontally from the claw portion 72. In FIGS. 16 and 18, a bottom end 66a of the retainer rod 66 is pressed against the stopper projection 77 under the bias of the rod biasing spring 68 and while the claw portion 72 is engaged with the ridge 74. A top end 66b of the retainer rod 66 during the contact between the bottom end 66a and the stopper projection 77 is located higher than the top of the cassette containing chamber 35. The top end 66b is contacted on the driven projection 60b of the rotating member 60 biased by the torsion coil spring 64 toward the closed position. Then the port shutter 21 is kept in the open position.

Figure 17:
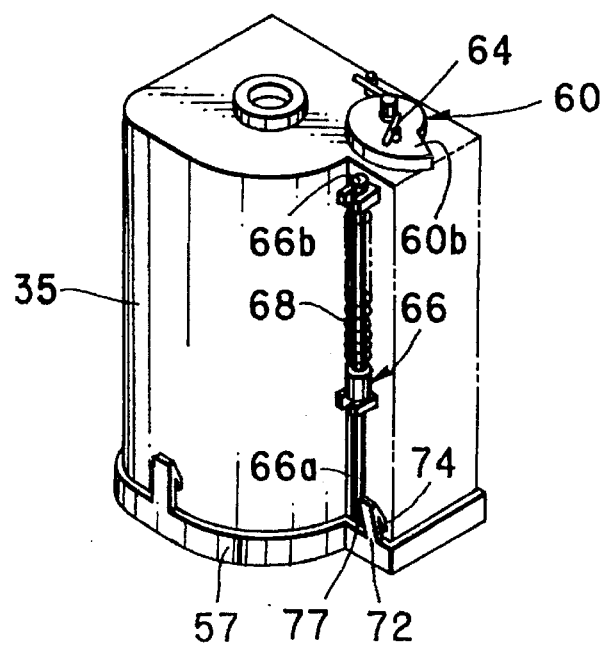
FIG. 17 is an explanatory view in perspective, illustrating a state of the retainer rod after the sliding.
Figure 19:
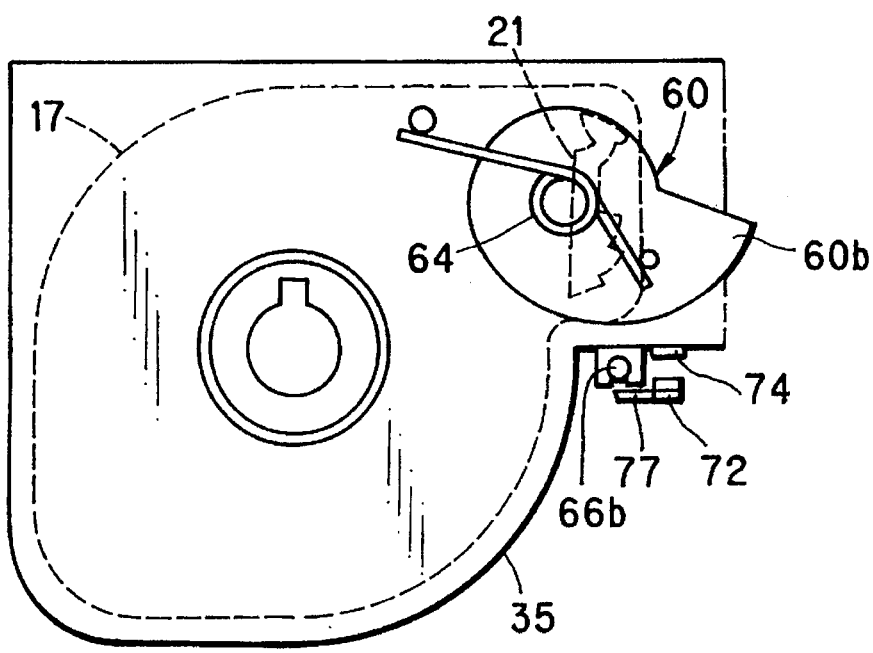
FIG. 19 is a plan illustrating the state of the retainer rod after the sliding.

To unload the cassette shell 17 after taking exposures, the tool or screwdriver is initially inserted to disengage the bottom cover 57 from the main body 12. When the tool bends down the main body 12 frontwards relative to the cassette containing chamber 35, the claw portion 72 is shifted as shown in FIGS. 17 and 19 away from the ridge 74. The stopper projection 77 is also moved away from the retainer rod 66, which is released and driven by the rod biasing spring 68 to slide down. The top end 66b of the retainer rod 66 is moved down and away from the driven projection 60b of the rotating member 60. The rotating member 60 is rotated by the torsion coil spring 64 in the closing direction of the port shutter 21. Thus the port shutter 21 is closed.

Then the bottom cover 57 and the first rear portion 54 are removed from the housing 3. The cassette shell 17 is slid down. The port shutter 21 is disengaged from the rotating member 60. The lock claw 27 of the cassette shell 17 enters the keyhole 25 to lock the port shutter 21 in the closed position.

Still another preferred embodiment is described, in which a retainer rod is rotatable. Elements similar to those of the above embodiments are designated with identical reference numerals.

Figure 20:
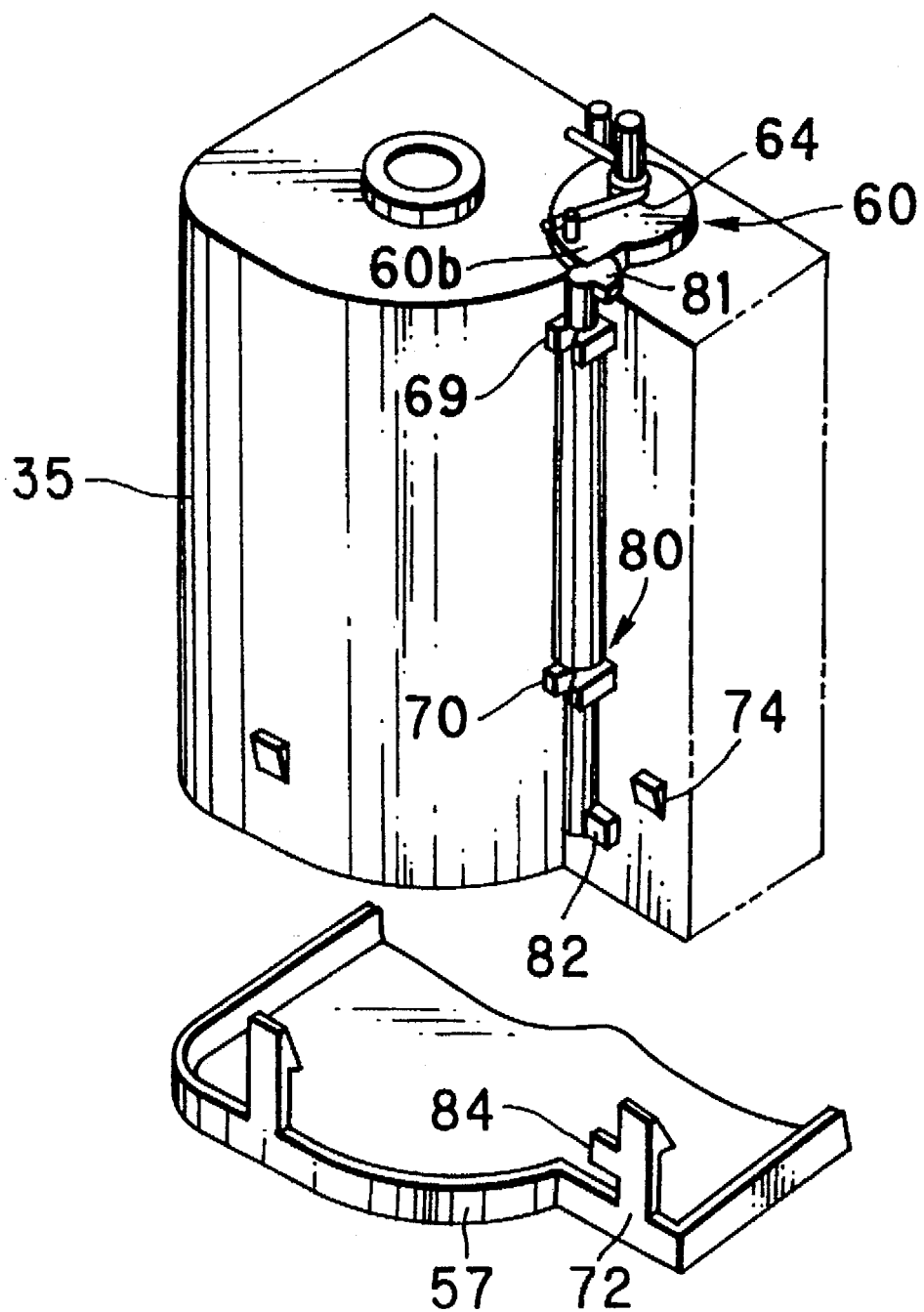
FIG. 20 is an explanatory view in perspective, illustrating still another preferred embodiment in which a rotatable retainer rod operates to rotate the rotating member.

In FIG. 20, the rotating member 60 is mounted on the top of the cassette containing chamber 35, engaged with the port shutter 21, and biased by the torsion coil spring 64 toward the closed position of the port shutter 21. On the front wall of the cassette containing chamber 35, a retainer rod 80 is rotatable while supported by the rail members 69 and 70. The retainer rod 80 has a flat top projection 81 and a bottom projection 82. The top projection 81 is of a sector shape for contact with the driven projection 60b of the rotating member 60 when the port shutter 21 has the open position. The bottom projection 82 operates for retention and release of the retainer rod 80.

Figure 21:
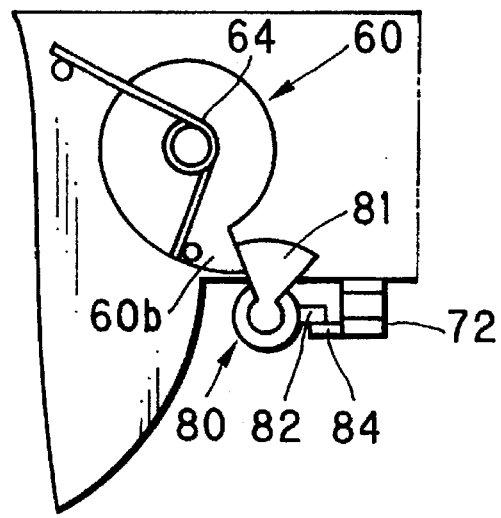
FIG. 21 is a plan illustrating a state of the retainer rod before rotation.

In FIG. 21, while the claw portion 72 is engaged with the ridge 74, the bottom projection 82 is squeezed between the front wall of the cassette containing chamber 35 and a stopper projection 84, which is formed with the claw portion 72. The retainer rod 80 is prevented from rotating. The rotating member 60 in contact with the top projection 81 is retained in the open position.

Figure 22:
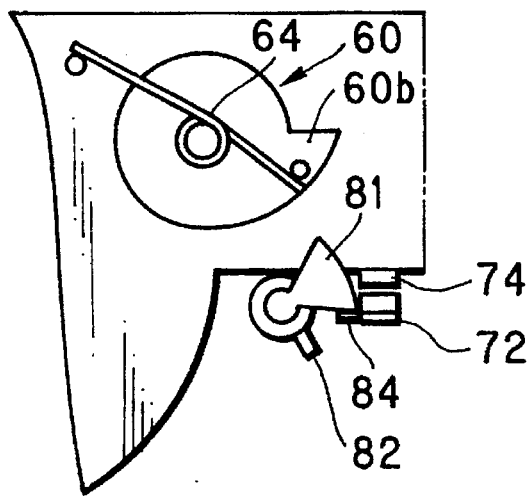
FIG. 22 is a plan illustrating a state of the retainer rod after the rotation.

To unload the cassette shell 17 after exposures, a tool such as a screwdriver is inserted between the claw portion 72 and the wall of the cassette containing chamber 35, to bend the claw portion 72 toward the front of the housing 3. In FIG. 22, the claw portion 72 is shifted to release the bottom projection 82 from being squeezed by the stopper projection 84. Responsively the top projection 81 of the retainer rod 80 is pressed by the driven projection 60b of the rotating member 60, and rotated clockwise. The rotating member 60 is released from the retention in the open position, so that the torsion coil spring 64 rotates the port shutter 21 to the closed position. Then the bottom cover 57 and the first rear portion 54 are removed from the housing 3 in the same manner as the above embodiments. The cassette shell 17 is slid out of the cassette containing chamber 35.

In the present embodiment, the rotating member 60 rotates to the closed position while the top projection 81 of the retainer rod 80 is stricken away by the rotating member 60. Alternatively it is possible to use a spring for rotating the retainer rod 80. Upon disengagement of the claw portion 72, the retainer rod 80 may be rotated by the spring. Rotational force of this rotation may be transmitted to the rotating member 60 so as to cause the rotating member 60 to rotate to the closed position.

In the above embodiments, the rotating member 28, 60 is allowed to rotate by disengaging the claw portion 44 of the first rear portion 54 or the claw portion 72 of the bottom cover 57. Alternatively it is possible to provide the main body 12 or the front cover 14 with a claw portion engaged with the first rear portion 54 or the bottom cover 57, and to allow the rotating member 28, 60 to rotate to the closed position by disengaging the claw portion from the first rear portion 54 or the bottom cover 57.

In the above embodiments, the bottom cover 57 is formed integrally with the first rear portion 54 of the rear cover 15. The cassette shell 17 is unloaded when the first rear portion 54 is eliminated. Alternatively it is possible to eliminate all the rear cover 15 inclusive of the bottom cover 57 from the housing 3 before the cassette shell 17 is unloaded.

In the above embodiments, the separating line 53 being thinned is formed between the second rear portion 15a of the rear cover 15 and the first rear portion 54. Alternatively it is possible to prepare two separate kinds of parts for the second rear portion 15a and the first rear portion 54, which can be connected in a light-tight manner in the housing 3 and in a separable manner for the time of unloading the cassette shell 17.

In the above embodiments, the bottom cover 57 is formed integrally with the first rear portion 54 of the rear cover 15. It is possible to form the bottom cover 57 separately from the first rear portion 54 or the rear cover 15. Furthermore it is possible to form the bottom cover 57 by means of a thin flexible hinge portion and integrally with the first rear portion 54 of the rear cover 15.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit including a cassette containing chamber and a photo film roll chamber, said cassette containing chamber containing a cassette, said roll chamber containing a roll of unexposed photo film drawn out of said cassette, said cassette incorporating a photo film port shutter rotatable between a closed position to block a photo film passage port and an open position to open said photo film passage port, said photo film being wound into said cassette by one frame after an exposure is taken thereon, said cassette being unloaded from said cassette containing chamber after-said photo film is wound therein, said lens-fitted photo film unit comprising:

a rotating member connected to said port shutter and rotatable between first and second positions, said port shutter having said open position when said rotating member has said first position, and said port shutter having said closed position when said rotating member has said second position, said rotating member being disconnected from said port shutter at a time of moving said cassette in said cassette containing chamber for unloading said cassette from said cassette containing chamber; and a drive mechanism for rotating said rotating member from said first position to said second position in response to external operation effected prior to moving said cassette in said cassette containing chamber.

2. A lens-fitted photo film unit as defined in claim 1, wherein said rotating member has a connective portion, disposed to project into said cassette containing chamber through an upper wall of said cassette containing chamber, for connection to said port shutter.

3. A lens-fitted photo film unit as defined in claim 2, wherein said drive mechanism includes:

a spring for biasing said rotating member from said first position toward said second position; and a retainer member for moving from a retaining position to a releasing position in response to said external operation, said retainer member retaining said rotating member in said first position against said spring when said retainer member has said retaining position, said retainer member allowing said spring to rotate said rotating member to said second position when said retainer member has said releasing position.

4. A lens-fitted photo film unit as defined in claim 3, further comprising:

a body having said cassette containing chamber and said roll chamber, said cassette containing chamber having a rear opening and a bottom opening;

a rear cover for covering a rear of said body; and a bottom cover for closing said bottom opening, said bottom cover being formed integrally with said rear cover, said bottom cover being removed from said bottom opening after said external operation to render said cassette movable in said cassette containing chamber.

5. A lens-fitted photo film unit as defined in claim 4, wherein said external operation is associated directly or indirectly with operation of removing said bottom cover from said body.

6. A lens-fitted photo film unit as defined in claim 4, further comprising a claw portion formed integrally with said rear cover, disposed above said cassette containing chamber, and engaged with said body for securing said rear cover to said body, said claw portion being disengaged by said external operation from said body.

7. A lens-fitted photo film unit as defined in claim 6, wherein said retainer member is formed integrally with said claw portion, and is moved to said releasing position when said claw portion is disengaged from said body.

8. A lens-fitted photo film unit as defined in claim 7, wherein said rear cover is removed together with said bottom cover from said body.

9. A lens-fitted photo film unit as defined in claim 7, wherein said rear cover includes:

a first portion for closing said rear opening of said cassette containing chamber, said bottom cover being formed integrally with said first portion;

a second portion for covering a rear of said body and beside said cassette containing chamber; and a separating line formed between said first and second portions, said first portion being broken away from said second portion along said separating line after said claw portion is disengaged from said body, for removal with said bottom cover from said body.

10. A lens-fitted photo film unit as defined in claim 9, wherein said rear cover has an opening, formed near to said claw portion, for receiving insertion of an external device, said external device deforming said claw portion for disengagement from said body.

11. A lens-fitted photo film unit as defined in claim 4, further comprising a claw portion formed integrally with said bottom cover, engaged with said body for closing said bottom opening with said bottom cover, said claw portion being removed from said body by said external operation.

12. A lens-fitted photo film unit as defined in claim 11, wherein said retainer member is extended between said claw portion and said rotating member along said cassette containing chamber, and is slid or rotated from said retaining position to said releasing position upon disengaging said claw portion from said body.

13. A lens-fitted photo film unit as defined in claim 12, wherein said retainer member has a top end engageable with said rotating member and a bottom end engageable with said claw portion;

when said claw portion is engaged with said body, said bottom end is engaged with said claw portion to set said retainer member in said retaining position, and said top end is engaged with said rotating member for retaining said rotating member in said first position; and when said claw portion is disengaged from said body, said bottom end is disengaged from said claw portion to slide said retainer member toward said releasing position, and said top end is disengaged from said rotating member for allowing said rotating member to rotate to said second position.

14. A lens-fitted photo film unit as defined in claim 13, further comprising:

a second spring for biasing said retainer member toward said releasing position; and a projection, formed integrally with said claw portion, for receiving said bottom end of said retainer member.

15. A lens-fitted photo film unit as defined in claim 12, wherein said retainer member has a top projection engageable with said rotating member and a bottom projection engageable with said claw portion;

when said claw portion is engaged with said body, said bottom projection is engaged with said claw portion to set said retainer member in said retaining position, and said top projection is engaged with said rotating member for retaining said rotating member in said first position; and when said claw portion is disengaged from said body, said bottom projection is disengaged from said claw portion to rotate said retainer member toward said releasing position, and said top projection is disengaged from said rotating member for allowing said rotating member to rotate to said second position.

16. A lens-fitted photo film unit as defined in claim 15, further comprising a projection, formed integrally with said claw portion, for receiving said bottom projection of said retainer member.

17. A lens-fitted photo film unit including a body in which a cassette containing chamber and a photo film roll chamber are formed, a rear cover for covering a rear of said body, a bottom cover for closing a bottom opening of said cassette containing chamber, first engaging means for engaging said bottom cover with said body, and second engaging means for engaging said rear cover with said body, said cassette containing chamber containing a cassette, said roll chamber containing a roll of unexposed photo film drawn out of said cassette, said cassette incorporating a photo film port shutter rotatable between a closed position to block a photo film passage port and an open position to open said photo film passage port, said photo film being wound into said cassette by one frame after an exposure is taken thereon, said cassette being unloaded from said cassette containing chamber through said bottom opening after said photo film is wound therein and said bottom cover is removed, said lens-fitted photo film unit comprising:

a rotating member connected to said port shutter and rotatable between first and second positions, said port shutter having said open position when said rotating member has said first position, and said port shutter having said closed position when said rotating member has said second position, said rotating member being disconnected from said port shutter at a time of moving said cassette in said cassette containing chamber for unloading said cassette from said cassette containing chamber; and a drive mechanism for rotating said rotating member from said first position to said second position in response to disengaging said first or second engaging means.

18. A cassette unloading method for a lens-fitted photo film unit, said lens-fitted photo film unit including a body in which a cassette containing chamber and a photo film roll chamber are formed, a rear cover for covering a rear of said body, a bottom cover for closing a bottom opening of said cassette containing chamber, first engaging means for engaging said bottom cover with said body, and second engaging means for engaging said rear cover with said body, said cassette containing chamber containing a cassette, said roll chamber containing a roll of unexposed photo film drawn out of said cassette, said cassette incorporating a photo film port shutter rotatable between a closed position to block a photo film passage port and an open position to open said photo film passage port, said cassette unloading method comprising steps of:

disengaging said first or second engaging means after said photo film is wound in said cassette;

rotating a rotating member in response to disengaging said first or second engaging means, said rotating member rotating said port shutter to set said port shutter in said closed position;

removing said bottom cover from said bottom opening after disengaging said first engaging means;

moving said cassette in said cassette containing chamber for exiting said cassette from said bottom opening at least partially, to disengage said rotating member from said port shutter; and moving said cassette further to exit said cassette from said cassette containing chamber.

* * * * *